(12) United States Patent
Kim et al.

(10) Patent No.: US 10,655,263 B2
(45) Date of Patent: May 19, 2020

(54) WASHING MACHINE

(71) Applicant: LG Electronics Inc., Seoul (KR)

(72) Inventors: Youngjun Kim, Seoul (KR);
Youngjong Kim, Seoul (KR);
Dongcheol Kim, Seoul (KR)

(73) Assignee: LG Electronics Inc., Seoul (KR)

(*) Notice: Subject to any disclaimer, the term of this patent is extended or adjusted under 35 U.S.C. 154(b) by 32 days.

(21) Appl. No.: 15/766,652

(22) PCT Filed: Oct. 8, 2016

(86) PCT No.: PCT/KR2016/011284
§ 371 (c)(1),
(2) Date: Apr. 6, 2018

(87) PCT Pub. No.: WO2017/061837
PCT Pub. Date: Apr. 13, 2017

(65) Prior Publication Data
US 2018/0313015 A1    Nov. 1, 2018

(30) Foreign Application Priority Data

Oct. 8, 2015  (KR) .......... 10-2015-0141717
Sep. 19, 2016 (KR) .......... 10-2016-0119241

(51) Int. Cl.
| | | |
|---|---|---|
| *D06F 17/08* | (2006.01) | |
| *D06F 17/10* | (2006.01) | |
| *D06F 23/04* | (2006.01) | |
| *D06F 37/12* | (2006.01) | |
| *D06F 37/40* | (2006.01) | |

(Continued)

(52) U.S. Cl.
CPC ............ *D06F 37/40* (2013.01); *D06F 37/12* (2013.01); *D06F 39/085* (2013.01); *D06F 39/088* (2013.01); *D06F 39/10* (2013.01); *D06F 17/08* (2013.01); *D06F 17/10* (2013.01); *D06F 23/04* (2013.01); *D06F 39/083* (2013.01); *F16H 1/28* (2013.01)

(58) Field of Classification Search
CPC .......... D06F 17/08; D06F 17/10; D06F 23/04; D06F 37/12; D06F 37/40; D06F 39/083; D06F 39/085; D06F 39/088; D06F 39/10; F16H 1/28
USPC ........ 68/13 R, 18 F, 53, 131, 132, 133, 134, 68/200
See application file for complete search history.

(56) References Cited

U.S. PATENT DOCUMENTS 5,989,418 A * 11/1999 Shin .................. D06F 39/10
                                                 210/136

FOREIGN PATENT DOCUMENTS

JP        5274703 B1 *  8/2013 ............. D06F 17/10

OTHER PUBLICATIONS

Hirose, "JP5274703B1 English Machine Translation.pdf", Aug. 28, 2013—Machine translation from Espacenet.com.*

* cited by examiner

*Primary Examiner* — Levon J Shahinian
(74) *Attorney, Agent, or Firm* — Fish & Richardson P.C.

(57) ABSTRACT

Disclosed is a washing machine for circulating and spraying wash water. The washing machine includes a tub for accommodating wash water therein, a drum within the tub for accommodating laundry therein, a pumping blade located on the bottom surface of the drum and moving the wash water inside the tub, a drive module connected to the pumping blade to rotate the pumping blade, and a wash water spray unit located on an upper end portion of the drum spraying the wash water moved by the pumping blade.

14 Claims, 7 Drawing Sheets

(51) Int. Cl.
*D06F 39/08* (2006.01)
*D06F 39/10* (2006.01)
*F16H 1/28* (2006.01)

[Fig. 1]
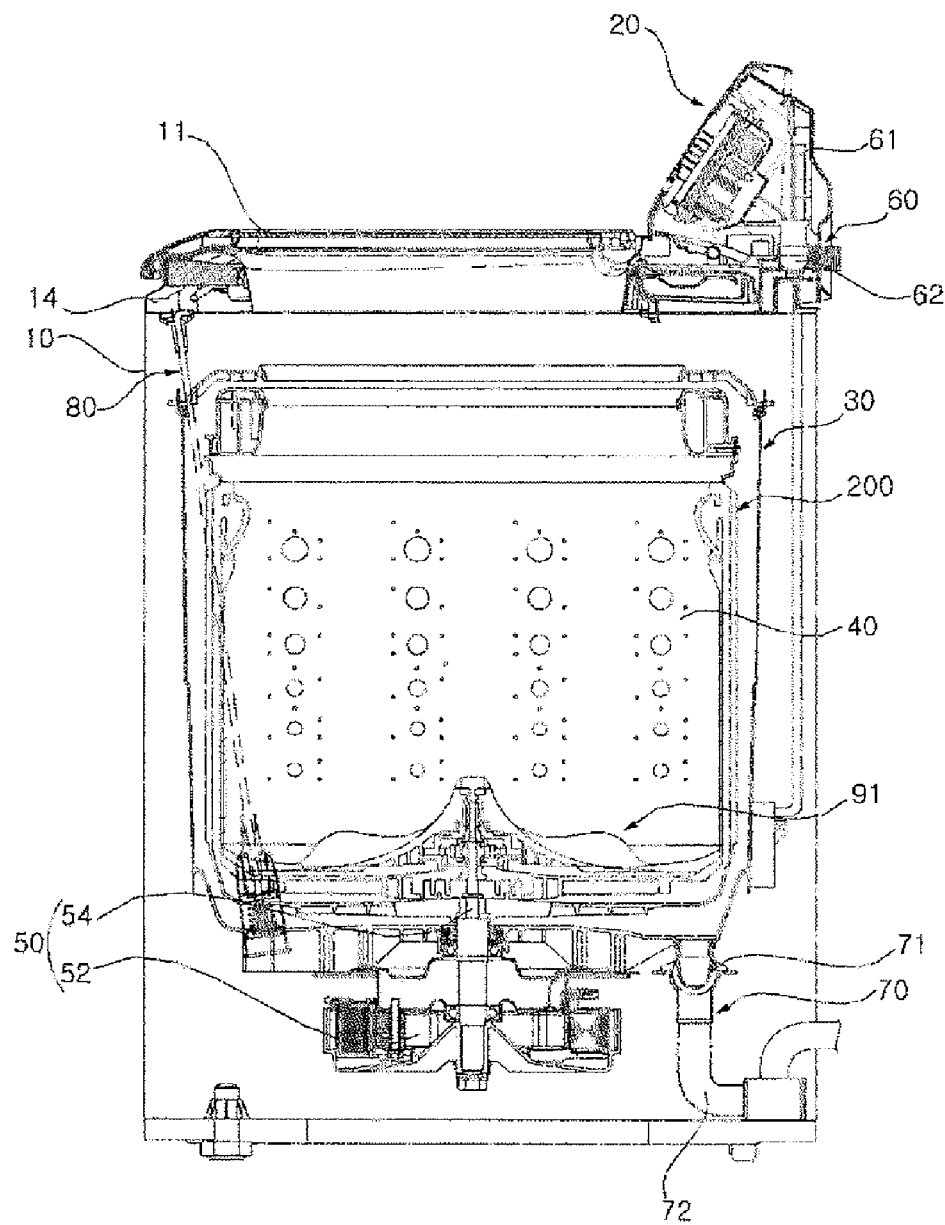

[Fig. 2]
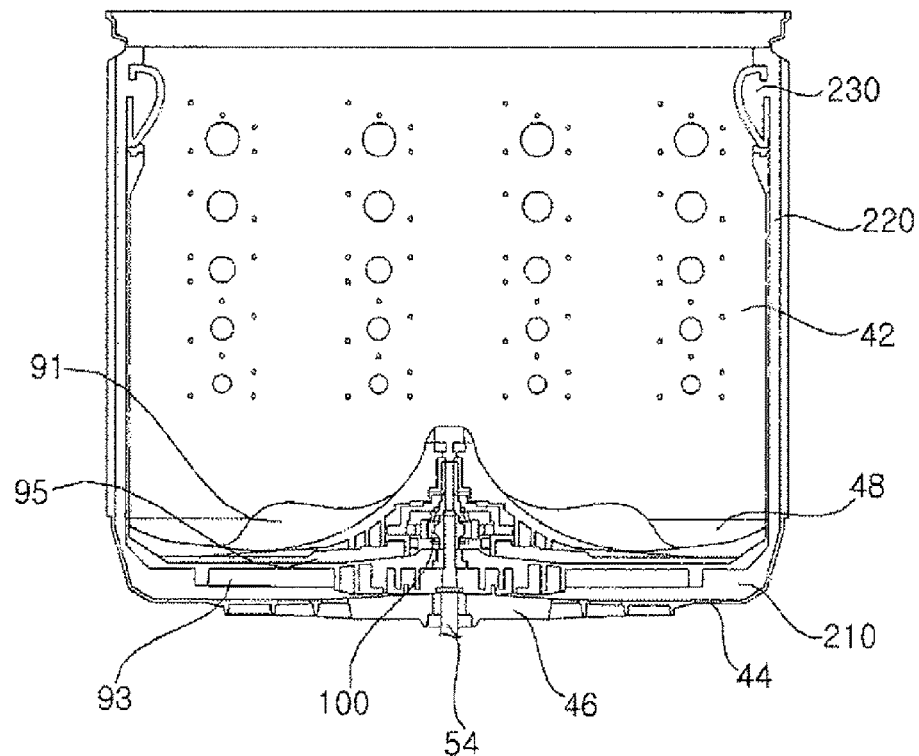
[Fig. 3]
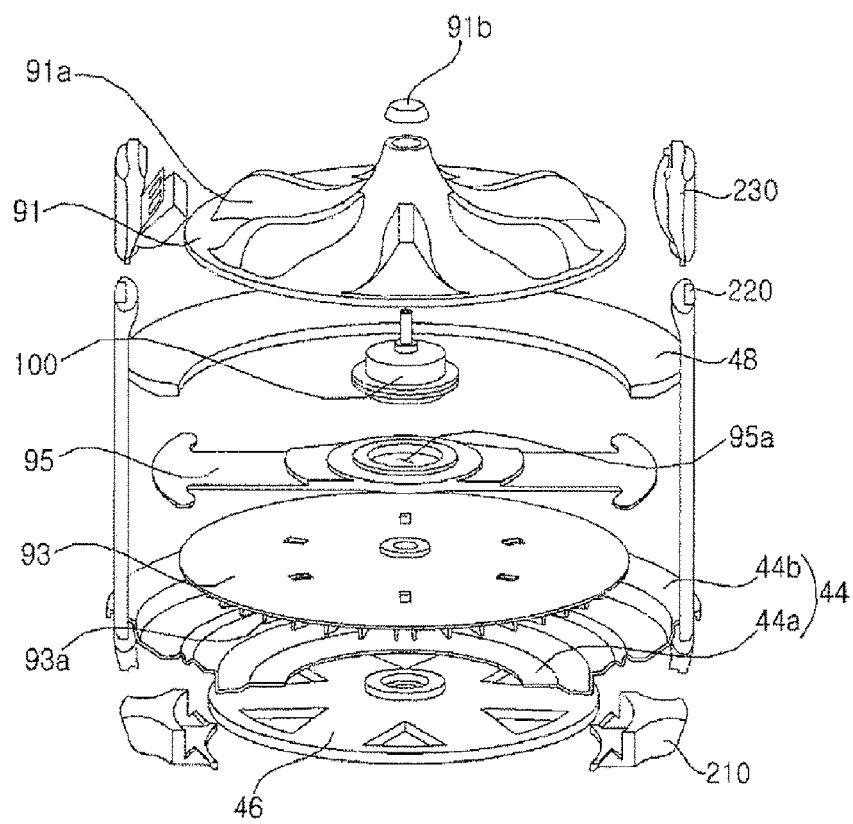

[Fig. 4]
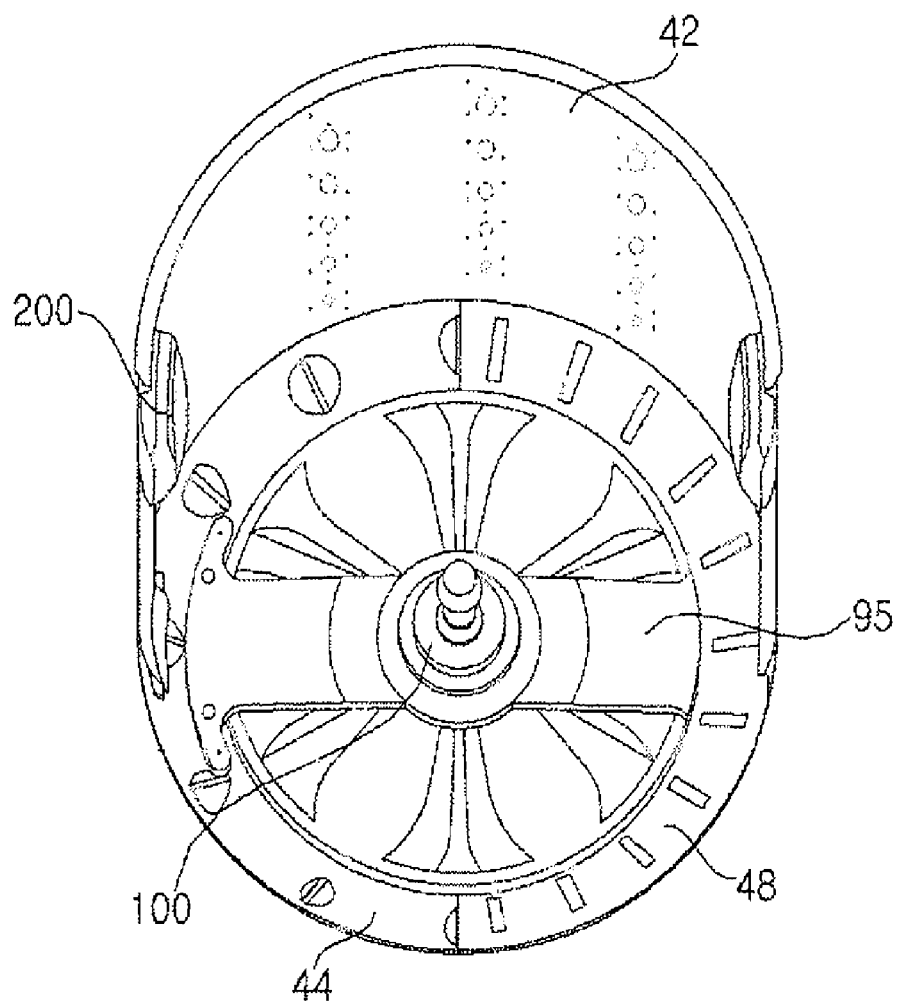

[Fig. 5a]
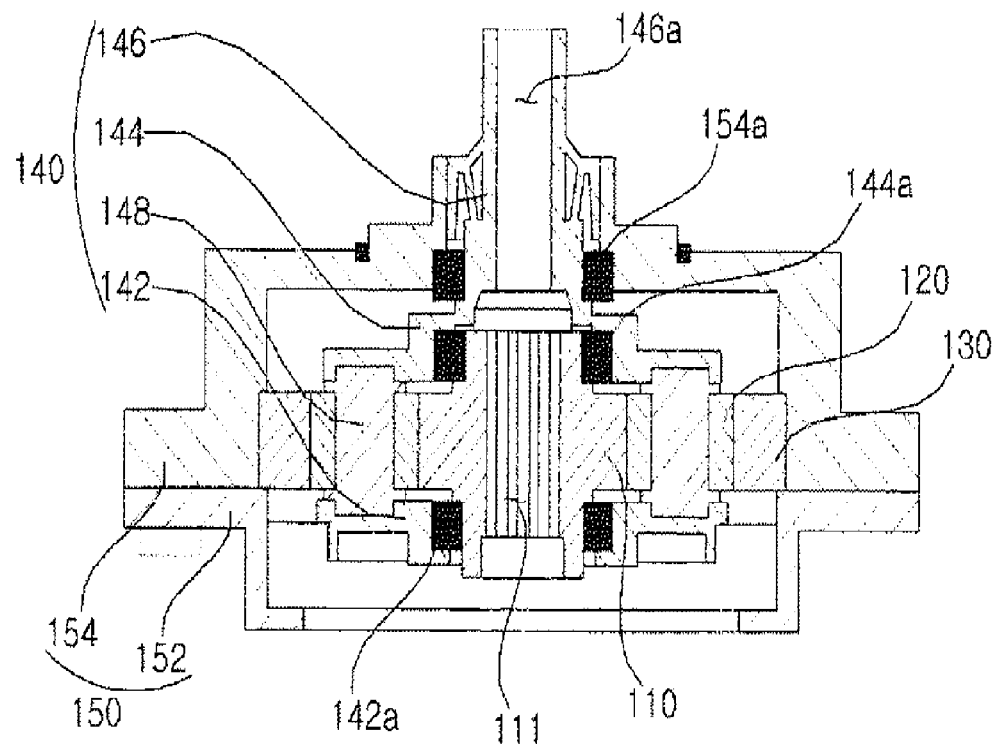
[Fig. 5b]
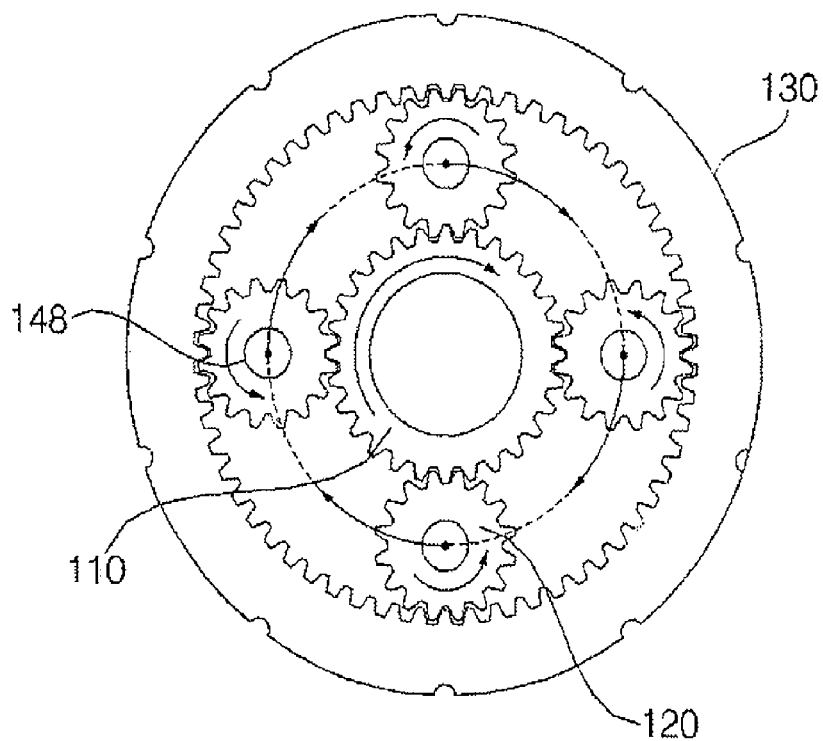

[Fig. 6]
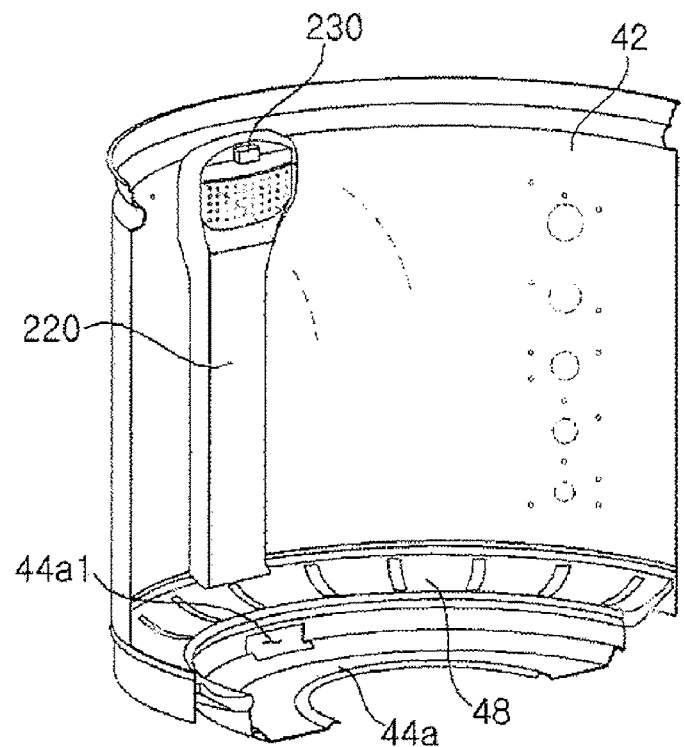
[Fig. 7]
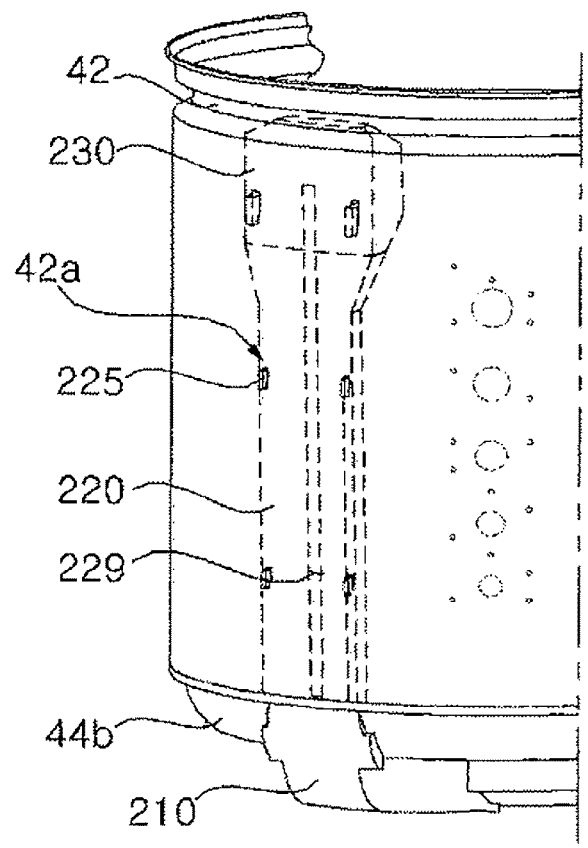

[Fig. 8]
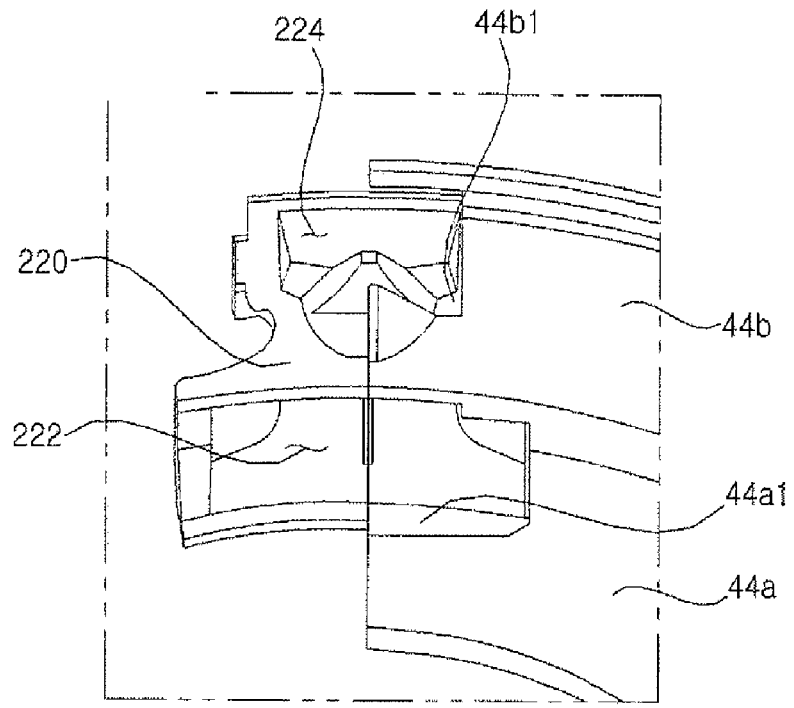
[Fig. 9]
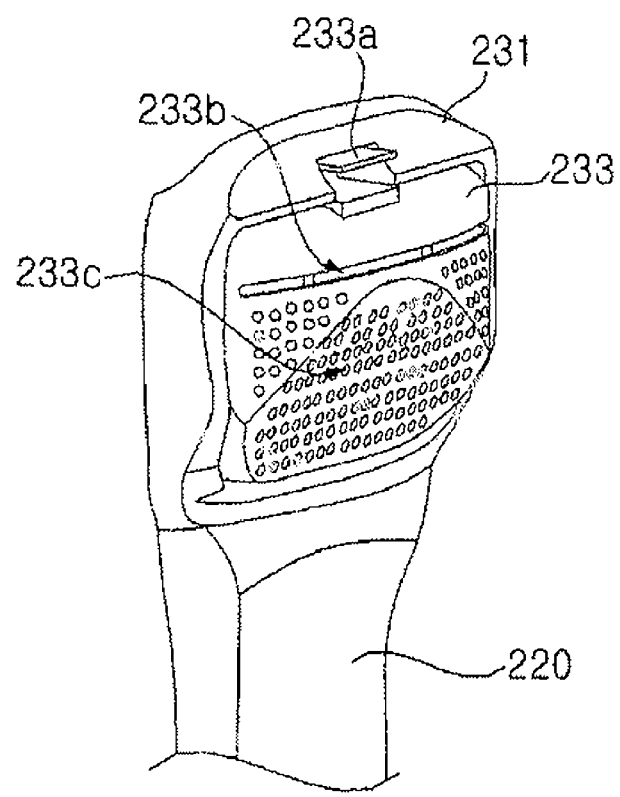

[Fig. 10]
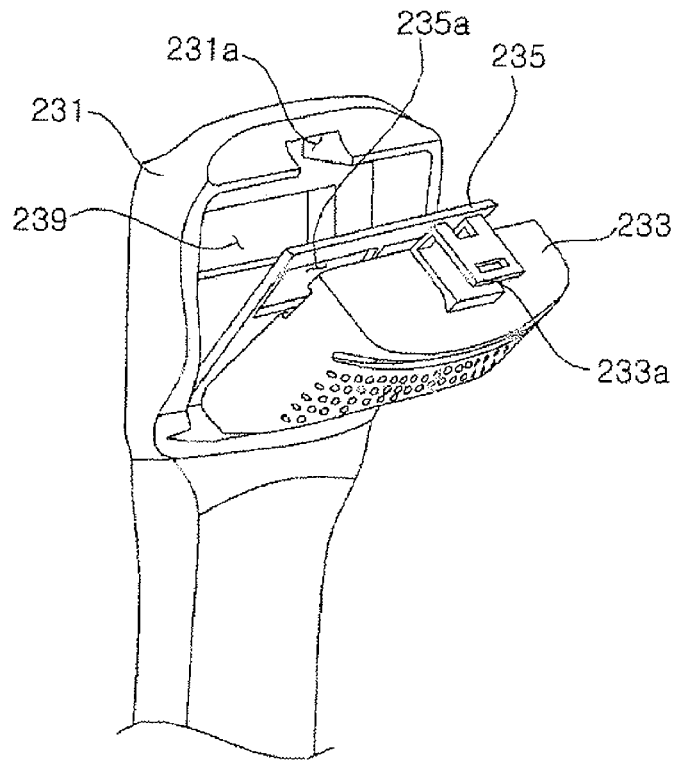
[Fig. 11]
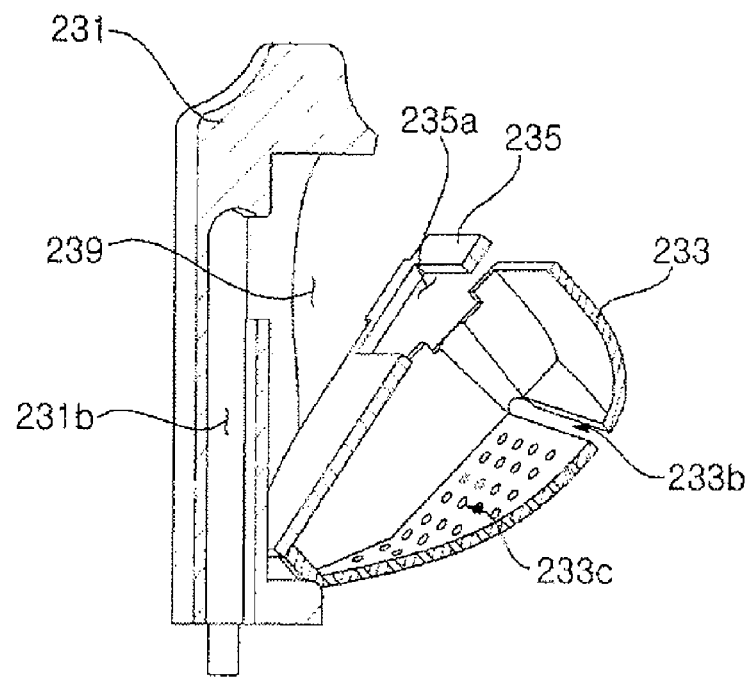

WASHING MACHINE

CROSS-REFERENCE TO RELATED APPLICATIONS

This application is a National Stage application under 35 U.S.C. § 371 of International Application No. PCT/KR2016/011284, filed Oct. 8, 2016, which claims the benefit of Korean Application No. 10-2016-0119241, filed on Sep. 19, 2016 and Korean Application No. 10-2015-0141717, filed on Oct. 8, 2015. The disclosures of the prior applications are incorporated by reference in their entirety.

TECHNICAL FIELD

The present invention relates to a washing machine, and more particularly, to a washing machine for circulating and spraying wash water.

BACKGROUND ART

Generally, a washing machine is an apparatus that washes clothes, bedclothes, and the like (hereinafter, also referred to as "fabric") via processes, such as, for example, washing, rinsing, and dehydration so as to remove contaminants adhered thereto using water, detergent, and mechanical action.

In particular, a top-loading-type washing machine forcibly moves fabric in a drum in a state in which detergent, wash water, and the fabric are introduced into the drum by forming a water stream using the mechanical force of a pulsator, which is located on the bottom surface of the drum so as to rotate upon receiving drive power from a drive motor. As such, washing is performed when an object to be washed is subjected to a physical action, such as friction or a shock. In addition, washing is performed via chemical activity resulting from contact of detergent and fabric.

However, the water stream attributable to the pulsator is actively generated in a lower region of the drum, but no flow of wash water occurs in the upper region of the drum, which causes deterioration in the overall flow of wash water.

DISCLOSURE OF INVENTION

Technical Problem

Therefore, the present invention has been made in view of the above problems, and it is an object of the present invention to provide a top-loading-type washing machine for circulating and spraying wash water.

The objects of the present invention are not limited to the object of the present invention as mentioned above, and other unmentioned objects will be clearly understood by those skilled in the art from the following description.

Solution to Problem

According to an aspect of the present invention, the above and other objects can be accomplished by the provision of a washing machine including a tub for accommodating wash water therein, a cylindrical drum within the tub for accommodating laundry therein, a pumping blade located on the bottom surface of the drum and moving the wash water inside the tub, a drive module connected to the pumping blade to rotate the pumping blade, and a wash water spray unit located on an upper end portion of the drum spraying the wash water moved by the pumping blade.

The wash water spray unit may spray the wash water in the form of a water film that is wide in a horizontal direction and is thin in a vertical direction.

The wash water spray unit may filter the wash water moved by the pumping blade.

The washing machine may further comprise a wash water flow path unit located on a side surface of the drum for guiding the wash water, moved by the pumping blade, to the wash water spray unit.

The wash water spray unit may include a spray unit housing coupled to the side surface of the drum and also coupled to the wash water flow path unit. And, the wash water spray unit may include a filter nozzle part separably coupled to a front surface of the spray unit housing. The filter nozzle part may have a nozzle hole.

The nozzle hole may be horizontally elongated.

The wash water flow path unit may have a wash water flow path therein for movement of the wash water. And, the spray unit housing may have a spray flow path therein connected to the wash water flow path.

The spray flow path may have an upper end located to correspond to the nozzle hole.

The wash water flow path unit and the filter nozzle part together may form a wash water accommodating space.

The filter nozzle part may have a plurality of filter holes below the nozzle hole.

Each of the plurality of filter holes may be smaller than the nozzle hole.

The wash water spray unit may further include a backflow prevention plate located between the spray unit housing and the filter nozzle part.

The backflow prevention plate may have a wash water passage hole formed to correspond to the nozzle hole.

The pumping blade may be located to be rotatable independently of the pulsator.

The blade may be located to be completely hidden when viewing the pulsator from an upper side.

Advantageous Effects of Invention

As is apparent from the above description, a washing machine according to the present invention has one or more effects as follows.

First, in a top-loading-type washing machine, wash water is circulated and sprayed from the upper end of a drum, which increases washing performance.

Second, the rotation of a pulsator and the circulation of wash water are performed at the same time, which facilitates the active movement of wash water.

Third, wash water is filtered while being sprayed, which may increase washing quality.

The effects of the present invention are not limited to the effects as mentioned above, and other unmentioned objects will be clearly understood by those skilled in the art from the following claims.

Although the embodiments of the present invention have been described above with reference to the accompanying drawings, the invention is not limited to the embodiments and may be fabricated into various forms. It will be understood by those skilled in the art that the present invention may be implemented into other specific forms without change in the technical idea or essential features of the present invention. Hence, it should be understood that the embodiments described above are given by way of example in all terms and are not limitative.

BRIEF DESCRIPTION OF DRAWINGS

The above and other objects, features and other advantages of the present invention will be more clearly understood from the following detailed description taken in conjunction with the accompanying drawings, in which:

FIG. 1 is a perspective view illustrating a washing machine according to an embodiment of the present invention;

FIG. 2 is a partial sectional view of the washing machine according to the embodiment of the present invention;

FIG. 3 is a partial exploded perspective view of the washing machine according to the embodiment of the present invention;

FIG. 4 is a partial perspective view of the washing machine according to the embodiment of the present invention;

FIG. 5A is a vertical sectional view illustrating a gear module in the washing machine according to the embodiment of the present invention;

FIG. 5B is a horizontal sectional view of the gear module of FIG. 5A;

FIGS. 6 and 7 are partial perspective views of the washing machine according to the embodiment of the present invention;

FIG. 8 is a perspective view illustrating a wash water introduction unit in the washing machine according to the embodiment of the present invention;

FIG. 9 is a perspective view illustrating a wash water spray unit in the washing machine according to the embodiment of the present invention;

FIG. 10 is an exploded perspective view of the wash water spray unit in the washing machine according to the embodiment of the present invention; and FIG. 11 is an exploded sectional view of the wash water spray unit in the washing machine according to the embodiment of the present invention.

BEST MODE FOR CARRYING OUT THE INVENTION

The advantages and features of the present invention and the way of attaining them will become apparent with reference to embodiments described below in detail in conjunction with the accompanying drawings. Embodiments, however, may be embodied in many different forms and should not be construed as being limited to example embodiments set forth herein. Rather, these example embodiments are provided so that this disclosure will be through and complete and will fully convey the scope to those skilled in the art. The scope of the present invention should be defined by the claims. Wherever possible, the same reference numbers will be used throughout the drawings to refer to the same or like parts.

Hereinafter, the present invention will be described with reference to the drawings, which are provided to explain a washing machine according to the embodiments of the present invention.

FIG. 1 is a perspective view illustrating a washing machine according to an embodiment of the present invention, FIG. 2 is a partial sectional view of the washing machine according to the embodiment of the present invention, FIG. 3 is a partial exploded perspective view of the washing machine according to the embodiment of the present invention, and FIG. 4 is a partial perspective view of the washing machine according to the embodiment of the present invention.

The washing machine according to the embodiment of the present invention includes a cabinet 10 defining the external appearance of the washing machine, a tub 30 for accommodating wash water therein, a cylindrical drum 40 placed in the tub 30 for accommodating laundry therein, a pulsator 91 rotatably placed on a drum base 44 that forms the bottom of the drum 40, a pumping blade 93 interposed between the pulsator 91 and the drum base 44 for moving the wash water, a drive module 50 for generating torque and rotating the pumping blade 93, a gear module 100 coupled to the drive module 50 so as to rotate the pulsator 91 upon receiving the torque while varying the speed at which the pulsator 91 rotates, and a wash water circulation module 200 for guiding the wash water, moved by the pumping blade 93, to the upper side of the drum 40 and spraying the wash water. The pumping blade 93 is located between the bottom of the drum 40 and the pulsator 91 so as to be rotatable independently of the pulsator 91.

The cabinet 10 defines the external appearance of the washing machine. The cabinet 10 is formed in the shape of a hexahedron having an open upper side. The tub 30, the drum 40, the drive module 50, a water supply module 60, a drain module 70, a suspension module 80, and the like are placed inside the cabinet 10.

A top cover 14, which is provided with a fabric introduction/discharge hole (not illustrated), is placed on the upper side of the cabinet 10 in order to enable the introduction or discharge of fabric into or from the drum 40. A door 11 is rotatably provided on the upper side of the top cover 14 in order to enable the opening or closing of the fabric introduction/discharge hole. A control panel 20 is provided on the exterior of the cabinet 10 and serves to receive user input and to display information about the state of the washing machine. In the present embodiment, the control panel 20 is located behind the door 11.

The tub 30 is placed inside the cabinet 10 for accommodating wash water therein. The tub 30 accommodates the drum 40 therein. The tub 30 is installed in a shock-absorbing manner by the suspension module 80. The suspension module 80 connects the cabinet 10 and the tub 30 to each other so as to reduce or absorb vibrations generated in the tub 30. The drive module 50 is located below the tub 30.

The drum 40 is placed inside the tub 30 for accommodating fabric therein. The drum 40 may rotate upon receiving torque from the drive module 50. The drum 40 includes a cylindrical drum body 42 for forming the circumferential surface of the drum 40, the circular drum base 44 coupled to the lower side of the drum body 42 so as to form the bottom of the drum 40, a hub 46 located underneath the drum base 44 so as to be coupled to the drive module 50, and a rim-shaped base cover 48 located around the pulsator 91 at the upper side of the drum base 44. The drive module 50 is coupled to the pulsator 91 and the pumping blade 93 so as to rotate the pulsator 91 and the pumping blade 93.

In the present embodiment, the washing machine is a top-loading-type washing machine in which the drum 40 has a vertical rotating shaft.

The drum base 44 includes a disc-shaped blade accommodating portion 44 in which the pumping blade 93 is accommodated, and a rim-shaped base peripheral portion 44b located on the outer circumference of the blade accommodating portion 44a. The base cover 48 is coupled to the upper side of the base peripheral portion 44b.

The drive module 50 generates torque. The drive module 50 is selectively connected to the hub 46 of the drum 40 and the pumping blade 93 so as to selectively rotate the drum 40 and the pumping blade 93. Specifically, a washing shaft and a dehydration shaft may be located on the same vertical axis, and only the washing shaft may rotate, or both the washing shaft and the dehydration shaft may rotate at the same time by the selection being made using a clutch. The washing shaft may be fixed to the pumping blade 93 so as to rotate along with the pumping blade 93, and the dehydration shaft may be fixed to the drum 40 so as to rotate along with the drum 40. The drive module 50 includes a motor 52 located below the tub 30 for generating torque, and a drive shaft 54 configured to be rotated by the torque of the motor 52. The drive shaft 54 penetrates the tub 30 and is selectively coupled to the hub 46 and the pumping blade 93. The drive shaft 54 may include the washing shaft and the dehydration shaft. The drive shaft 54 is coupled to the gear module 100 so as to transfer the torque to the gear module 100.

The water supply module 60 supplies wash water to the tub 30. The water supply module 60 includes a water supply valve 61 for adjusting the introduction of wash water supplied from an external water source, and a water supply path 62 through which the wash water, supplied from the external water source, flows when the water supply valve 61 is opened. The water supply path 62 guides the wash water to the tub 30. The water supply path 62 may be connected to a detergent box (not illustrated) in which detergent is accommodated, such that the wash water flowing in the water supply path 62 may be mixed with the detergent in the detergent box to thereby be introduced into the tub 30.

The drain module 70 discharges the wash water accommodated in the tub 30 to the outside. The drain module 70 includes a drain pump 71 for pumping the wash water accommodated in the tub 30, and a drain hose 72 for guiding the wash water, pumped by the drain pump 71, to the outside of the cabinet 10.

The pumping blade 93 is rotatably located between the pulsator 91 and the drum base 44 and serves to move the wash water inside the tub 30. The pumping blade 93 is coupled to the drive shaft 54 and is rotated by the drive module 50. The pumping blade 93 is accommodated in the blade accommodating portion 44a. The pumping blade 93 has a disc shape, and a plurality of pumping blade pieces 93a are radially formed so as to protrude downward from the pumping blade 93. The wash water, moved by the pumping blade 93, is guided to the upper end of the drum 40 by the wash water circulation module 200 to thereby be sprayed into the drum 40. The pumping blade 93 rotates simultaneously with the pulsator 91. When only the washing shaft, among the washing shaft and the dehydration shaft, is rotated by the selection being made using the clutch, each of the pumping blade 93 and the pulsator 91 rotates relative to the drum 40. When the washing shaft and the dehydration shaft rotate at the same time by the selection being made using the clutch, the drum 40 also rotates, and neither the pumping blade 93 nor the pulsator 91 rotates relative to the drum 40.

The pulsator 91 is rotatably placed on the drum base 44 so as to form a stream of the wash water inside the tub 30. The pulsator 91 may move fabric inside the drum 40. The pulsator 91 is provided with an upwardly protruding washing blade 91a. The pulsator 91 is coupled to the gear module 100 so as to be rotated by the gear module 100. The pulsator 91 is coupled to the gear module 100 using a long bolt (not illustrated), and a pulsator cap 91b, which covers the upper end of the long bolt, is provided on the center of the pulsator 91.

The pumping blade 93 is completely hidden when viewing the pulsator 91 from the upper side. When viewed from the upper side, the pulsator 91 is located so as to cover the entire pumping blade 93. When viewed from the upper side, the pulsator 91 is located to cover the entire pumping blade 93. Because the upper side of the pumping blade 93 is hidden, the pumping blade 93 does not come into contact with an object to be washed inside the drum 40. Accordingly, the pumping blade 93 receives no load attributable to contact with the object to be washed, but receives load attributable to the pumping of wash water during the rotation thereof. The pulsator 91 is provided so as to come into contact with the object to be washed.

The entirety of the drum base 44 is depressed downward. The pumping blade 93 is located in the space defined in the downwardly depressed drum base 44. Specifically, the entirety of the drum base 44 is depressed downward so as to form the blade accommodating portion 44a. The pumping blade 93 is accommodated in the blade accommodating portion 44a. The pulsator 91 covers the upper side of the blade accommodating portion 44a. When the drum base 44 is depressed downward, a space is defined between the bottom surface of the drum base 44 and the lower surface of the pulsator 91. The pumping blade 93 is located in the space between the bottom surface of the drum base 44 and the lower surface of the pulsator 91.

The pulsator 91 rotates simultaneously with the pumping blade 93. The pulsator 91 rotates in the same direction as the pumping blade 93. The pulsator 91 rotates more slowly than the pumping blade 93. The pulsator 91 may rotate relative to the drum 40. The pumping blade 93 may rotate relative to the drum 40.

A ring gear jig 95 is coupled to the gear module 100. The ring gear jig 95 is coupled to the gear module 100 so as to rotate the pulsator 91 in the same direction as the pumping blade 93. The ring gear 95 has an "I"-shaped form and is centrally provided with a jig hole 95a for coupling the gear module 100. Opposite ends of the ring gear jig 95 are coupled to the base peripheral portion 44b of the drum base 44. The opposite ends of the ring gear jig 95 are covered with the base cover 48.

The gear module 100 is coupled to the drive shaft 54 of the drive module 50 so as to receive torque. The gear module 100 is coupled to the pulsator 91 so as to rotate the pulsator 91 while varying the speed at which the pulsator 91 rotates. The gear module 100 reduces the rotation speed so that the pulsator 91 rotates more slowly than the pumping blade 93. The gear module 100 causes the pulsator 91 to rotate in the same direction as the pumping blade 93. The detailed structure of the gear module 100 will be described below with reference to FIGS. 5A and 5B.

The wash water circulation module 200 guides the wash water, moved by the pumping blade 93, to the upper side of the drum 40 and sprays the wash water. The wash water circulation module 200 is provided in a plural number. In the present embodiment, two wash water circulation modules 200 are provided. The two wash water circulation modules 200 are symmetrically arranged about the rotating shaft of the drum 40 so as to face each other.

The wash water circulation module 200 includes a wash water introduction unit 210 coupled to the drum base 44 so that the wash water, moved by the pumping blade 93, is introduced thereinto, a wash water flow path unit 220 provided on the inner surface of the drum body 42 for guiding the wash water, introduced into the wash water introduction unit 210, to the upper end of the drum body 42, and a wash water spray unit 230 located on the upper end of the drum body 42 for spraying the wash water guided through the wash water flow path unit 220.

The detailed structure of the wash water circulation module 200 will be described below with reference to FIGS. 6 to 12.

FIGS. 5A and 5B are sectional views illustrating the gear module in the washing machine according to the embodiment of the present invention.

The gear module 100 according to the embodiment of the present invention includes a sun gear 110 coupled to the drive shaft 54 so as to rotate, a plurality of planetary gears 120 engaged with the sun gear 110 so as to rotate along the outer circumferential surface of the sun gear 110, a ring-shaped ring gear 130 engaged with the planetary gears 120, a carrier 140 for connecting the planetary gears 120 to each other so as to rotate in response to the rotation of the planetary gears 120 along the circumferential surface of the sun gear 110, and a gear housing 150 defining the external appearance of the gear module 100, the gear housing 150 being engaged with the ring gear 130 and coupled to the ring gear jig 95.

Referring to FIG. 5B, an example of the directions in which the gears rotate will be described. The directions in which the gears rotate are related to the speed at which the gears rotate relative to the drum 40. The ring gear 130 is fixed to the gear housing 150, the gear housing 150 is fixed to the ring gear jig 95, and the ring gear jig 95 is fixed to the drum 40. The ring gear 130 is stationary, rather than rotating relative to the drum 40. In this state, when the sun gear 110 rotates in the clockwise direction, the planetary gears 120 rotate on their axes in the counterclockwise direction. Because the ring gear 130 is fixed, the planetary gears 120 rotate in the clockwise direction along the inner circumferential surface of the ring gear 130. Contrary, when the sun gear 110 rotates in the counterclockwise direction, the planetary gears 120 rotate on their axes in the clockwise direction and also rotate in the counterclockwise direction along the inner circumferential surface of the ring gear 130.

The direction in which the planetary gears 120 rotate along the circumferential surface of the ring gear 130 is the direction in which the carrier 140 rotates. Because the sun gear 110 rotates along with the pumping blade 93, the direction in which the sun gear 110 rotates is the direction in which the pumping blade 93 rotates. Because the carrier 140 rotates along with the pulsator 91, the direction in which the carrier 140 rotates is the direction in which the pulsator 91 rotates. In the present embodiment, because the sun gear 110 and the carrier 140 rotate in the same direction, the pumping blade 93 and the pulsator 91 rotate in the same direction.

The sun gear 110 is located in the center lower region of the gear module 100 and is coupled to the drive shaft 54. The sun gear 110 rotates upon receiving torque from the drive shaft 54. A sun gear bore 111 is formed in the center of the sun gear 110, into which the drive shaft 54 is inserted and coupled. Each of the sun gear bore 111 and the drive shaft 54 corresponding thereto has a serrated shape. The planetary gears 120 are arranged around the sun gear 110. The outer circumferential surface of the sun gear 110 is engaged with the planetary gears 120.

The planetary gears 120 are located between the sun gear 110 and the ring gear 130 and are engaged with the sun gear 110 and the ring gear 130. The planetary gears 120 respectively rotate on their axes and also rotate along the outer circumferential surface of the sun gear 110 via rotation of the sun gear 110. A planetary gear shaft 148 is provided on the inner circumferential surface of each of the planetary gears 120. Each of the planetary gears 120 rotates about the planetary gear shaft 148. The planetary gears 120 rotate along the outer circumference of the sun gear 110, thereby rotating the carrier 140.

The ring gear 130 is located around the planetary gears 120. The inner circumferential surface of the ring gear 130 is engaged with the planetary gears 120, and the outer circumferential surface of the ring gear 130 is engaged with the gear housing 150. The ring gear 130 is fixed by the ring gear jig 95 so as to allow the planetary gears 120 to rotate along the outer circumferential surface of the sun gear 110.

The carrier 140 is located at the upper side and the lower side of the planetary gears 120 and connects the planetary gears 120 to one another. The carrier 140 rotates via the rotation of the planetary gears 120 along the outer circumferential surface of the sun gear 110 and is coupled to the pulsator 91 so as to rotate the pulsator 91.

The carrier 140 includes a plurality of planetary gear shafts 148 rotatably provided on the inner circumferential surface of the respective planetary gears 120, a lower carrier body 142 coupled to the lower ends of the planetary gear shafts 148, an upper carrier body 144 coupled to the upper ends of the planetary gear shafts 148, and a carrier shaft 146 coupled to the upper carrier body 144 so as to be coupled to the pulsator 91.

The planetary gear shafts 148 are fixed and coupled, at the upper ends thereof, to the upper carrier body 144, and are fixed and coupled, at the lower ends thereof, to the lower carrier body 142. The lower carrier body 142 rotatably supports the lower end of the sun gear 110. A lower carrier body bearing 142a is provided between the lower carrier body 142 and the sun gear 110. The upper carrier body 144 rotatably supports the upper end of the sun gear 110. An upper carrier body bearing 144a is provided between the upper carrier body 144 and the sun gear 110.

The carrier shaft 146 is coaxially located with the sun gear 110. The carrier shaft 146 penetrates and protrudes from the upper side of the gear housing 150. The carrier shaft 146 is centrally provided with a carrier shaft bore 146a for insertion of the long bolt. The carrier shaft 146 is coupled to the pulsator 91 via the long bolt.

The gear housing 150 includes a lower housing 152 forming the external appearance of the lower portion of the gear module 100, and an upper housing 154 defining the external appearance of the upper portion of the gear module 100, the lower and upper housings 152 and 154 being coupled to each other.

The lower housing 152 has a splined periphery so as to be coupled to the ring gear jig 95. The lower housing 152 is inserted into the jig hole 95a. The inner circumferential surface of the upper housing 154 is engaged with the ring gear 130. The carrier shaft 146 penetrates the center of the upper housing 154. An upper housing bearing 154a is provided between the upper housing 154 and the carrier shaft 146. The gap between the upper housing 154 and the carrier shaft 146 is sealed.

FIGS. 6 and 7 are partial perspective views of the washing machine according to the embodiment of the present invention, FIG. 8 is a perspective view illustrating a wash water introduction unit in the washing machine according to the embodiment of the present invention, FIG. 9 is a perspective view illustrating a wash water spray unit in the washing machine according to the embodiment of the present invention, FIG. 10 is an exploded perspective view of the wash water spray unit in the washing machine according to the embodiment of the present invention, and FIG. 11 is an exploded sectional view of the wash water spray unit in the washing machine according to the embodiment of the present invention.

The wash water circulation module 200 according to the embodiment of the present invention includes the wash water introduction unit 210, which is provided on the drum base 44 for the introduction of wash water through a wash water discharge hole 44a1. The wash water discharge hole 44a1 is formed in the side surface of the blade accommodating portion 44a. The wash water discharge hole 44a1 is formed so as to face the pumping blade 93. The wash water discharge hole 44a1 faces the outer circumferential portion of the pumping blade 93. The circulation module 200 includes the wash water flow path unit 220 in which a wash water flow path 229 is formed so as to guide the wash water, introduced into the wash water introduction unit 210, to the upper end of the drum body 42. The wash water circulation module 200 includes the wash water spray unit 230, which is provided on the upper portion of the drum body 42 to spray the wash water guided through the wash water flow path 229.

The wash water introduction unit 210 guides the wash water, moved by the pumping blade 93, to the wash water flow path unit 220. The blade accommodating portion 44a has the wash water discharge hole 44a1 formed in the side surface thereof, through which the wash water moved by the pumping blade 93 is discharged. The wash water introduction unit 210 is located so as to correspond to the wash water discharge hole 44a1. The wash water introduction unit 210 is located to correspond to the wash water discharge hole 44a1.

The wash water introduction unit 210 is coupled to the outer surface of the drum base 44. The wash water introduction unit 210 has an approximately "L"-shaped form, and includes a lower portion coupled to the side surface of the blade accommodating portion 44a of the drum base 44 and an upper portion coupled to the base peripheral portion 44b of the drum base 44. The wash water introduction unit 210 has an introduction unit lower hole 222 and an introduction unit upper hole 224. The introduction unit lower hole 222 is connected to the wash water discharge hole 44a1. The base peripheral portion 44b is provided with a wash water introduction unit penetration hole 44b1, and the upper end of the wash water introduction unit 210 is coupled to the wash water flow path unit 220 through the wash water introduction unit penetration hole 44b1.

The wash water flow path unit 220 guides the wash water, introduced into the wash water introduction unit 210, to the wash water spray unit 230. The wash water flow path unit 220 has the wash water flow path 229 formed therein for the movement of wash water. The wash water flow path 229 may be formed between the wash water flow path unit 220 and the inner circumferential surface of the drum body 42. The wash water flow path 229 is connected at the lower end thereof to the introduction unit upper hole 224 and at the upper end thereof to a spray flow path 231b that will be described below. The upper end of the wash water flow path unit 220 is connected to the wash water spray unit 230.

The base cover 48 is provided with a wash water flow path unit penetration hole (not illustrated), through which the lower end of the wash water flow path unit 220 penetrates. The lower end of the wash water flow path unit 220 is connected to the wash water introduction unit 210 through the wash water flow path unit penetration hole 44b1.

The wash water flow path unit 220 is located on a side surface of the drum 40 for guiding the wash water, moved by the pumping blade 93, to the wash water spray unit 230. The wash water flow path unit 220 is located on an inner side surface of the drum 40 for guiding the wash water, moved by the pumping blade 93, to the wash water spray unit 230. The wash water flow path unit 220 is coupled to the inner circumferential surface of the drum body 42. A flow path unit hook 225 is formed on the rear surface of the wash water flow path unit 220, and a drum hook hole 42a is formed in the side surface of the drum body 42 so that the flow path unit hook 225 catches in the drum hook hole 42a. In some embodiments, the wash water flow path 229 may be coupled to the outer circumferential surface of the drum body 42 so as to be located between the drum body 42 and the tub 30. In some embodiments, the wash water flow path 229 may be integrally formed with the drum body 42.

The wash water spray unit 230 sprays the wash water, moved by the pumping blade 93, into the drum 40. The wash water spray unit 230 sprays the wash water, guided to the upper end of the drum 40 through the wash water flow path unit 220, in the form of a water film that is wide in the horizontal direction and is thin in the vertical direction. The wash water spray unit 230 filters the wash water moved by the pumping blade 93 so as to collect impurities, such as lint, included in the wash water.

The wash water spray unit 230 includes a spray unit housing 231 coupled to the upper end of the inner circumferential surface of the drum body 42 and also coupled to the wash water flow path unit 220, a filter nozzle part 233 separably coupled to the front surface of the spray unit housing 231, the filter nozzle part 233 having a horizontally elongated nozzle hole 233b, and a backflow prevention plate 235 located between the spray unit housing 231 and the filter nozzle part 233.

The spray unit housing 231 has a spray flow path 231b formed therein for the movement of wash water. The lower end of the spray flow path 231b is connected to the upper end of the wash water flow path 229. The upper end of the spray flow path 231b is open at the front side thereof. The upper end of the spray flow path 231b is located so as to correspond to the nozzle hole 233b that will be described below. The upper end of the spray flow path 231b is located to correspond to the nozzle hole 233b.

The spray unit housing 231 and the filter nozzle part 233 together form a wash water accommodating space 239. The periphery of the spray unit housing 231 protrudes forward so as to form the accommodating space 239. The upper end of the periphery of the spray unit housing 231 protrudes further than the lower end of the periphery thereof. Thereby, the wash water accommodating space 239 is formed such that an upper region is wider than a lower region on the basis of the upper end of the spray flow path 231b.

The filter nozzle part 233 is separably coupled to the front surface of the spray unit housing 231. A spray unit hook recess 231a, in which a filter nozzle part hook 233a that will be described below is caught, is formed in the upper end of the spray unit housing 231.

The filter nozzle part 233 has the horizontally elongated nozzle hole 233b therein. The filter nozzle part 233 further has a plurality of filter holes 233c, which are fine holes formed below the nozzle hole 233b. Some of the wash water moved through the spray flow path 231b is sprayed through the nozzle hole 233b in the form of a water film that is wide in the horizontal direction and is thin in the vertical direction. Another portion of the wash water moved through the spray flow path 231b falls down through the filter holes 233c. The wash water is filtered while passing through the filter holes 223c. Impurities, such as lint, filtered from the wash water are collected between the filter nozzle part 233 and the backflow prevention plate 235 that will be described below.

The filter nozzle part 233 is separably coupled to the protruding periphery of the spray unit housing 231. The filter nozzle part 233 is provided on the upper end thereof with the filter nozzle part hook 233a, which is configured so as to be caught in the spray unit hook recess 231a.

The backflow prevention plate 235 has a plate shape and is located in the wash water accommodating space 239. The backflow prevention plate 235 has a wash water passage hole 235a formed therein so as to correspond to the nozzle hole 233b. The wash water passage hole 235a is formed in the backflow prevention plate 235 at a position at which it horizontally faces the nozzle hole 233b. The backflow prevention plate 235 allows the wash water moved through the spray flow path 231b to pass through the wash water passage hole 235a, but prevents impurities, such as lint, from moving into the spray flow path 231b.

As is apparent from the above description, a washing machine according to the present invention has one or more effects as follows.

First, in a top-loading-type washing machine, wash water is circulated and sprayed from the upper end of a drum, which increases washing performance.

Second, the rotation of a pulsator and the circulation of wash water are performed at the same time, which facilitates the active movement of wash water.

Third, wash water is filtered while being sprayed, which may increase washing quality.

The effects of the present invention are not limited to the effects as mentioned above, and other unmentioned objects will be clearly understood by those skilled in the art from the following claims.

Although the embodiments of the present invention have been described above with reference to the accompanying drawings, the invention is not limited to the embodiments and may be fabricated into various forms. It will be understood by those skilled in the art that the present invention may be implemented into other specific forms without change in the technical idea or essential features of the present invention. Hence, it should be understood that the embodiments described above are given by way of example in all terms and are not limitative.

The invention claimed is:

1. A washing machine comprising:
a tub for accommodating wash water therein;
a drum within the tub for accommodating laundry therein;
a pulsator rotatably placed on a bottom surface of the drum;
a pumping blade located between the bottom surface of the drum and the pulsator and moving the wash water inside the tub;
a drive module connected to the pulsator and the pumping blade and configured to rotate the pulsator and the pumping blade; and
a wash water spray unit located on an upper end portion of the drum and configured to spray the wash water moved by the pumping blade,
wherein the wash water spray unit comprises:
a spray unit housing coupled to a side surface of the drum, and
a filter nozzle part separably coupled to a front surface of the spray unit housing, and
wherein the filter nozzle part defines a nozzle hole that is elongated in a horizontal direction and that is configured to spray the wash water as water film having a horizontal width in the horizontal direction greater than a vertical thickness in a vertical direction.

2. The washing machine of claim 1, wherein the wash water spray unit filters the wash water moved by the pumping blade.

3. The washing machine of claim 1, further comprising a wash water flow path unit located on a side surface of the drum for guiding the wash water, moved by the pumping blade, to the wash water spray unit.

4. The washing machine of claim 3, wherein
the spray unit housing is coupled to the wash water flow path unit.

5. The washing machine of claim 4, wherein the wash water flow path unit has a wash water flow path therein for movement of the wash water, and
wherein the spray unit housing has a spray flow path therein connected to the wash water flow path.

6. The washing machine of claim 5, wherein the spray flow path has an upper end located to correspond to the nozzle hole.

7. The washing machine of claim 4, wherein the wash water flow path unit and the filter nozzle part together form a wash water accommodating space.

8. The washing machine of claim 1, wherein the filter nozzle part further defines a plurality of filter holes vertically below the nozzle hole.

9. The washing machine of claim 8, wherein each of the plurality of filter holes is smaller than the nozzle hole.

10. The washing machine of claim 1, wherein the wash water spray unit further includes a backflow prevention plate located between the spray unit housing and the filter nozzle part.

11. The washing machine of claim 10, wherein the backflow prevention plate has a wash water passage hole formed to correspond to the nozzle hole.

12. The washing machine of claim 10, wherein the filter nozzle part further defines a plurality of filter holes vertically below the nozzle hole, and
wherein the backflow prevention plate comprises a lower portion that covers the plurality of filter holes and an upper portion that defines a wash water passage hole corresponding to the nozzle hole.

13. The washing machine of claim 1, wherein the pumping blade is located to be rotatable independently of the pulsator.

14. The washing machine of claim 1, wherein the pumping blade is located to be completely hidden when viewing the pulsator from an upper side of the drum.

* * * * *